United States Patent
Lai et al.

(10) Patent No.: US 12,095,993 B2
(45) Date of Patent: Sep. 17, 2024

(54) METHOD AND APPARATUS OF THE QUANTIZATION MATRIX COMPUTATION AND REPRESENTATION FOR VIDEO CODING

(71) Applicant: MEDIATEK INC., Hsinchu (TW)

(72) Inventors: Chen-Yen Lai, Hsinchu (TW); Olena Chubach, San Jose, CA (US); Tzu-Der Chuang, Hsinchu (TW); Ching-Yeh Chen, Hsinchu (TW); Chih-Wei Hsu, Hsinchu (TW); Yu-Wen Huang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 149 days.

(21) Appl. No.: 17/436,824

(22) PCT Filed: Mar. 6, 2020

(86) PCT No.: PCT/CN2020/078123
§ 371 (c)(1),
(2) Date: Sep. 7, 2021

(87) PCT Pub. No.: WO2020/182069
PCT Pub. Date: Sep. 17, 2020

(65) Prior Publication Data
US 2022/0182629 A1    Jun. 9, 2022

Related U.S. Application Data

(60) Provisional application No. 62/816,978, filed on Mar. 12, 2019, provisional application No. 62/816,167, filed on Mar. 10, 2019.

(51) Int. Cl.
*H04N 19/126* (2014.01)
*H04N 19/159* (2014.01)
(Continued)

(52) U.S. Cl.
CPC ......... *H04N 19/126* (2014.11); *H04N 19/159* (2014.11); *H04N 19/176* (2014.11); *H04N 19/18* (2014.11)

(58) Field of Classification Search
CPC .. H04N 19/126; H04N 19/159; H04N 19/176; H04N 19/18
See application file for complete search history.

(56) References Cited

U.S. PATENT DOCUMENTS 9,143,789 B2     9/2015  Zhou et al.
10,448,026 B1 *  10/2019 Xu ..................... H04N 19/105
(Continued)

FOREIGN PATENT DOCUMENTS

CN     101039421 A     9/2007
CN     103220517 A     7/2013
(Continued)

OTHER PUBLICATIONS

Choi et al.,, CE6: Unified Matrix for transform (test 6-1.2a) Doc. JVET-M0200, Marrakech, MA Jan. 9-18, 2019 (Year: 2019).*
Partial Supplementary European Search Report dated Sep. 21, 2022, issued in application No. EP 20769777.2.
Li, B., et al.; "Non-SCCE1: Unification of intra BC and inter modes;" Joint Collaborative Team on Video Coding (JCT-VC) of ITU-T SG 16 WP 3 and ISO/IEC JTC 1/SC 29/WG 11; Jun. 2014; pp. 1-28.
(Continued)

*Primary Examiner* — Dramos Kalapodas
(74) *Attorney, Agent, or Firm* — McClure, Qualey & Rodack, LLP

(57) ABSTRACT

A method and apparatus for video coding using a coding mode belonging to a mode group comprising an Intra Block Copy (IBC) mode and an Intra mode are disclosed. According to the present invention, for both IBC and Intra mode, a same default scaling matrix is used to derive the scaling matrix for a current block. In another embodiment, for the current block with block size of M×N or N×M, and M greater than N, a target scaling matrix is derived from an M×M scaling matrix by down-sampling the M×M scaling matrix to an M×N or N×M scaling matrix.

4 Claims, 8 Drawing Sheets

(51) Int. Cl.
*H04N 19/176* (2014.01)
*H04N 19/18* (2014.01)

(56) References Cited

U.S. PATENT DOCUMENTS

| | | | | |
|---|---|---|---|---|
| 10,469,845 | B1* | 11/2019 | Zhao | H04N 19/105 |
| 11,272,180 | B2 | 3/2022 | Nagumo et al. | |
| 2011/0150350 | A1 | 6/2011 | Saitoh et al. | |
| 2014/0010284 | A1 | 1/2014 | Hong et al. | |
| 2014/0177728 | A1 | 6/2014 | Zhang et al. | |
| 2015/0023412 | A1 | 1/2015 | Tanaka et al. | |
| 2015/0043637 | A1 | 2/2015 | Morigami et al. | |
| 2016/0241852 | A1 | 8/2016 | Gamei et al. | |
| 2017/0105014 | A1* | 4/2017 | Lee | H04N 19/85 |
| 2019/0246142 | A1* | 8/2019 | Zhao | H04N 19/132 |
| 2020/0288131 | A1* | 9/2020 | Zhao | H04N 19/18 |
| 2020/0314429 | A1 | 10/2020 | Haque et al. | |
| 2021/0006796 | A1* | 1/2021 | Tsukuba | H04N 19/61 |
| 2021/0274197 | A1* | 9/2021 | Lee | H04N 19/60 |
| 2022/0248017 | A1* | 8/2022 | Lim | H04N 19/176 |

FOREIGN PATENT DOCUMENTS

| | | |
|---|---|---|
| EP | 3 481 063 A1 | 5/2019 |
| EP | 3 780 621 A1 | 2/2021 |
| WO | 2016/123091 A1 | 8/2016 |
| WO | 2018/008387 A1 | 1/2018 |

OTHER PUBLICATIONS

De Lagrange, P., et al.; "Non-CE7: Use INTER quantization matrices for IBC;" Joint Video Experts Team (JVET) of ITU-T SG 16 WP 3 and ISO/IEC JTC 1/SC 29/WG 11; Jul. 2019; pp. 1-4.

International Search Report and Written Opinion dated Jun. 5, 2020, issued in application No. PCT/CN2020/078123.

Chubach, O., et al.; "CE7-related: Support of signalling default and user-defined scaling matrices;" Joint Video Experts Team (JVET) of ITU-T SG 16 WP 3 and ISO/IEC JTC 1/SC 29/WG 11; Mar. 2019; pp. 1-5.

Chubach, O., et al.; "CE7-related: Support of quantization matrices for VVC;" Joint Video Experts Team (JVET) of ITU-T SG 16 WP 3 and ISO/IEC JTC 1/SC 29/WG 11; Mar. 2019; pp. 1-4.

Choi, K., et al.; "CE6: Unified matrix for transform (Test 6-1.2a);" Joint Video Experts Team (JVET) of ITU-T SG 16 WP 3 and ISO/IEC JTC 1/SC 29/WG 11; Jan. 2019; pp. 1-8.

Toma, T., et al.; "CE7-related: Support of quantization matrices;" Joint Video Exploration Team (JVET) of ITU-T SG 16 WP 3 and ISO/IEC JTC 1/SC 29/WG 11; Oct. 2018; pp. 1-5.

Chinese language office action dated Dec. 30, 2020, issued in application No. TW 109107624.

Extended European Search Report dated Jul. 26, 2023, issued in application No. EP 23184386.3.

* cited by examiner

METHOD AND APPARATUS OF THE QUANTIZATION MATRIX COMPUTATION AND REPRESENTATION FOR VIDEO CODING

CROSS REFERENCE TO RELATED APPLICATIONS

The present invention claims priority to U.S. Provisional Patent application, Ser. No. 62/816,167, filed on Mar. 10, 2019 and U.S. Provisional Patent application, Ser. No. 62/816,978, filed on Mar. 12, 2019. The U.S. Provisional Patent applications are hereby incorporated by reference in their entireties.

FIELD OF THE INVENTION

The present invention relates to transform coefficient coding for video coding. In particular, the present invention discloses quantization matrix derivation and representation.

BACKGROUND AND RELATED ART

Adaptive Intra/Inter video coding has been widely used in various video coding standards, such as MPEG-2, AVC (advanced video coding) and HEVC (High Efficiency Video Coding). In adaptive Intra/Inter video coding, an input signal is predicted by Intra/Inter predictor to generate prediction residues. The residues are often processed by a two-dimensional transform and quantized. The quantized transform coefficients are then coded. The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A CTU can be further partitioned into multiple Coding Units (CUs) through Quad-Tree or Quadtree (QT) partitioning. The QT partition splits a block of size 4N×4N into 4 equal-size 2N×2N sub-blocks. The CTU can be a single CU (i.e., no splitting) or can be split into four smaller units of equal size, which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set).

According to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU, including 2N×2N, 2N×N, N×2N, N×N, 2N×nU, 2N×nD, nL×2N and nR×2N partition types. Unlike the CU, the PU may only be split once according to HEVC.

After obtaining the residual block by the prediction process based on PU splitting type, the prediction residues of a CU can be partitioned into transform units (TU) according to another quadtree structure which is analogous to the coding tree for the CU. The TU is a basic representative block having residual or transform coefficients for applying the integer transform and quantization. For each TU, one integer transform having the same size as the TU is applied to obtain residual coefficients. These coefficients are transmitted to the decoder after quantization on a TU basis.

FIG. 1 illustrates an exemplary adaptive Inter/Intra video coding system incorporating transform and quantization to process prediction residues. For Inter-prediction, Motion Estimation (ME)/Motion Compensation (MC) 112 is used to provide prediction data based on video data from other picture or pictures. Switch 114 selects Intra Prediction 110 or Inter-prediction data and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion, coding modes, and other information associated with the image area. The side information may also be compressed by entropy coding to reduce required bandwidth. Accordingly, the data associated with the side information are provided to Entropy Encoder 122 as shown in FIG. 1. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1, incoming video data undergoes a series of processing in the encoding system. The reconstructed video data from REC 128 may be subject to various impairments due to a series of processing. Accordingly, Loop filter 130 is often applied to the reconstructed video data before the reconstructed video data are stored in the Reference Picture Buffer 134 in order to improve video quality. For example, de-blocking filter (DF) and Sample Adaptive Offset (SAO) have been used in the High Efficiency Video Coding (HEVC) standard. The loop filter may also include ALF (Adaptive Loop Filter). The loop filter information may have to be incorporated in the bitstream so that a decoder can properly recover the required information. Therefore, loop filter information is provided to Entropy Encoder 122 for incorporation into the bitstream. In FIG. 1, Loop filter 130 is applied to the reconstructed video before the reconstructed samples are stored in the reference picture buffer 134. The system in FIG. 1 is intended to illustrate an exemplary structure of a typical video encoder. It may correspond to the High Efficiency Video Coding (HEVC) system or H.264.

FIG. 2 illustrates a system block diagram of a corresponding video decoder for the encoder system in FIG. 1. Since the encoder also contains a local decoder for reconstructing the video data, some decoder components are already used in the encoder except for the entropy decoder 210. Furthermore, only motion compensation 220 is required for the decoder side. The switch 146 selects Intra-prediction or Inter-prediction and the selected prediction data are supplied to reconstruction (REC) 128 to be combined with recovered residues. Besides performing entropy decoding on compressed residues, entropy decoding 210 is also responsible for entropy decoding of side information and provides the side information to respective blocks. For example, Intra mode information is provided to Intra-prediction 110, Inter mode information is provided to motion compensation 220, loop filter information is provided to loop filter 130 and residues are provided to inverse quantization 124. The residues are processed by IQ 124, IT 126 and subsequent reconstruction process to reconstruct the video data. Again, reconstructed video data from REC 128 undergo a series of processing including IQ 124 and IT 126 as shown in FIG. 2 and are subject to coding artefacts. The reconstructed video data are further processed by Loop filter 130.

The quantization matrix (QM) has been used in various video coding standards. For example, the quantization matrix is used for the quantization 120 in FIG. 1 and the inverse quantization 124 in FIG. 2. Block-based hybrid video coding schemes which imply transform coding of the residual signal can use frequency dependent scaling to control the distribution of the quantization distortion across different frequencies in a transform unit (TU). In order to achieve perceptually uniform quantization across spatial frequencies, a quantization matrix can be designed to weight each frequency channel associated with the transform coefficient according to the perceived sensitivity over its related frequency range. Accordingly, low frequency coefficients in the transform block will be quantized with a finer quantization step size compared to high frequency coefficients. The corresponding quantization matrix can be employed to inversely weight de-quantized transform coefficients at the decoder.

Quantization matrix has been successfully utilized in video coding standards, such as H.264/AVC and H.265/HEVC (High Efficiency Video Coding), which allows to improve the subjective quality of video content. Due to their effectiveness, quantization matrices have been widely used in numerous video coding products.

The HEVC specification includes four integer inverse transform matrices of sizes 4×4, 8×8, 16×16, and 32×32. These transform matrices are integer approximations of the DCT-2 matrix of the same size, aiming at the preservation of the DCT (discrete cosine transform) coefficient structure. An additional 4×4 DST (discrete sine transform) matrix is specified which is applied to the residual of Intra predicted 4×4 blocks. For distinction from the DST, the four DCTs are referred to as the HEVC core transforms.

BRIEF SUMMARY OF THE INVENTION

A method and apparatus for video coding using a coding mode belonging to a mode group comprising an Intra Block Copy (IBC) mode and an Inter mode are disclosed. According to the present invention, input data related to a current block in a current picture are received, wherein the input data corresponds to a transform block of the current block at a video encoder side and the input data corresponds to a decoded-quantized transform block of the current block at a video decoder side. A current coding mode is determined for the current block. If the current coding mode corresponds to the IBC mode, a scaling matrix is derived from a shared base scaling matrix. If the current corresponds to the Intra mode, the scaling matrix is derived from the shared base scaling matrix. A quantization process is then applied to the input data according to the scaling matrix to generate a coded-quantized transform block at the video encoder side or an inverse quantization process is applied to the input data according to the scaling matrix to generate a decoded transform block at the video decoder side.

According to another method, input data related to a current block in a current picture are received, wherein the input data corresponds to a transform block of the current block at a video encoder side and the input data corresponds to a decoded-quantized transform block of the current block at a video decoder side, and wherein block size of the current block corresponds to M×N or N×M, and wherein M and N are a positive integer and M is greater than N. A target scaling matrix is derived from an M×M scaling matrix by down-sampling the M×M scaling matrix to an M×N or N×M scaling matrix. A quantization process is applied to the input data according to the target scaling matrix to generate a coded-quantized transform block at the video encoder side or an inverse quantization process is applied to the input data according to the target scaling matrix to generate a decoded transform block at the video decoder side.

In one embodiment, M×M scaling matrix is generated by up-sampling an 8×8 shared based scaling matrix and the M is greater than 8. For example, the up-sampling may correspond to pixel repetition. In another example, the up-sampling may correspond to linear interpolation.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. In this invention, a new quantization matrices representation method for video coding in VVC as follows.

Default Quantization Matrices Representation

Quantization matrix is being evaluated for adoption in the emerging new video coding standard, named VVC (Versatile Video Coding) as a next generation video coding standard and a successor to H.265/HEVC. The quantization matrix is also called scaling matrix in this disclosure.

The information related to scaling matrices can be signaled in the sequence parameter set (SPS) and further updated in the picture parameter set (PPS). A frequency dependent scaling can be enabled by using the syntax element scaling_list_enabled_flag in SPS. When this flag is enabled, additional flags in SPS and PPS control whether the default quantization matrices or non-default quantization matrices are used.

Figure 1:
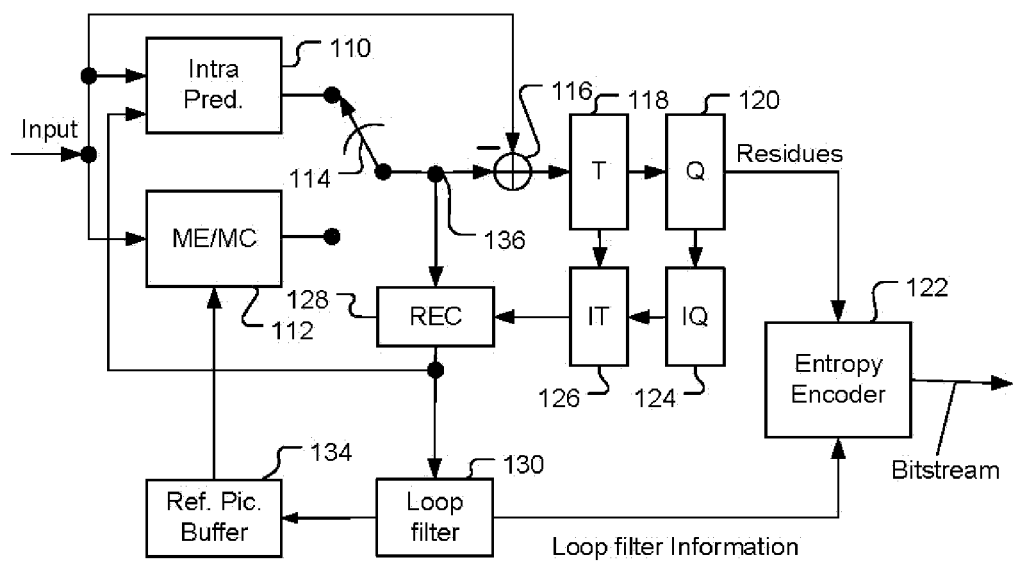
FIG. 1 illustrates an exemplary block diagram of a video encoder, where the video encoder incorporates Intra/Inter prediction, transform and quantization processes.
Figure 2:
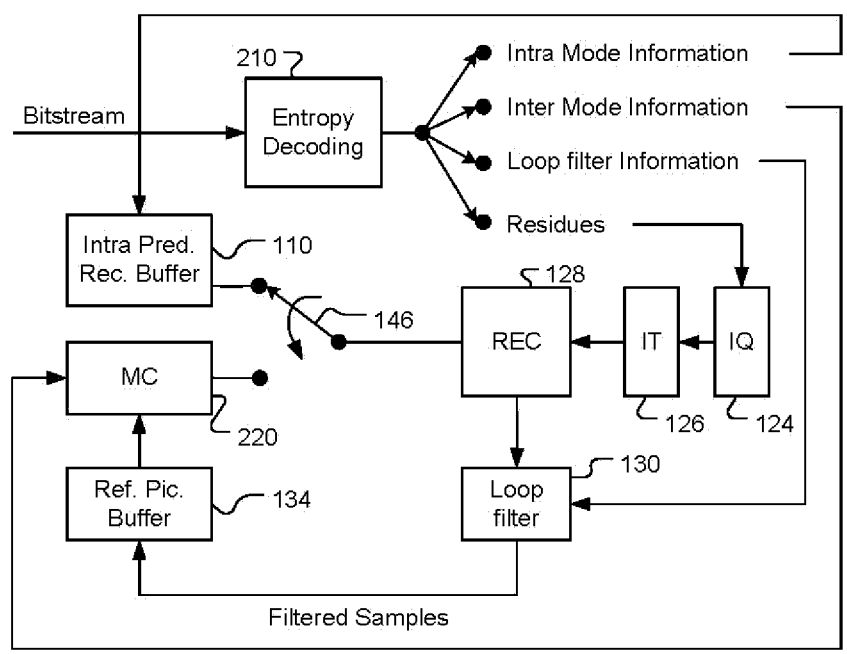
FIG. 2 illustrates an exemplary block diagram of a video decoder, where the video decoder incorporates Intra/Inter prediction, inverse transform and de-quantization processes.
Figures 3, 4:
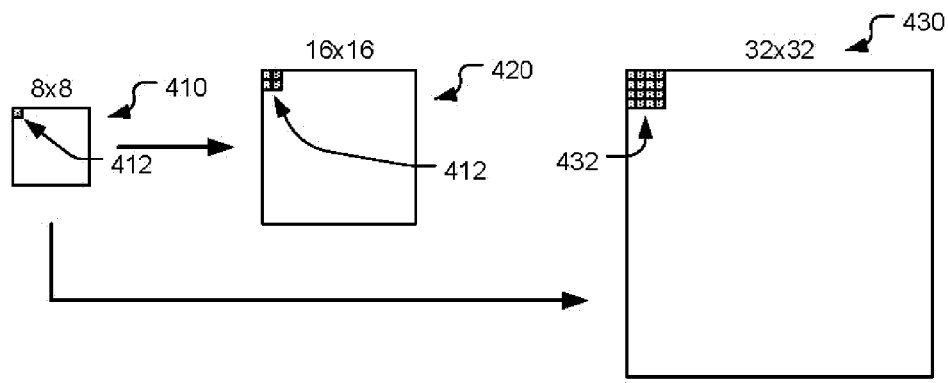
FIG. 3 illustrates examples of 4×4 and 8×8 shared based base scaling matrices for deriving larger scaling matrices for luma and chroma components in the Intra and Inter coding modes.
FIG. 4 illustrates an example of deriving the quantization matrices for transform blocks of size 16×16 and 32×32 from a shared based 8×8 quantization matrix of the same type by up-sampling using replication.

When frequency dependent scaling is enabled, the quantization matrices of sizes 4×4 and 8×8 have default values as shown in FIG. 3. As shown in FIG. 3, 4×4 matrix 310 is used for luma and chroma components in the Intra and Inter modes, 8×8 matrix 320 is used for luma and chroma components in the Intra mode, and 8×8 matrix 330 is used for luma and chroma components in the Inter mode.

For example, the following 20 quantization matrices are supported for different sizes and types of the transform block:

Luma: Intra4×4, Inter4×4, Intra8×8, Inter8×8, Intra16×16, Inter16×16, Intra32×32, Inter32×32

Cb: Intra4×4, Inter4×4, Intra8×8, Inter8×8, Intra16×16, Inter16×16

Cr: Intra4×4, Inter4×4, Intra8×8, Inter8×8, Intra16×16, Inter16×16

In order to reduce the memory needed to store the quantization matrices, 8×8 matrices are used to generate 16×16 and 32×32 quantization matrices. The default quantization matrices for transform blocks of size 16×16 and 32×32 are obtained from the default 8×8 quantization matrices of the same type by up-sampling using replication. This procedure is shown in FIG. 4: the dot-filled block 412 in the figure indicate that a quantization matrix entry in the 8×8 quantization matrix 410 is replicated into a 2×2 region 422 in the 16×16 quantization matrix 420 and into a 4×4 region 432 in the 32×32 quantization matrix 430.

Non-default quantization matrices can also be optionally transmitted in the bitstream in sequence parameter sets (SPS) or picture parameter sets (PPS).

Adaptive Multiple Core Transform

Figure 5:
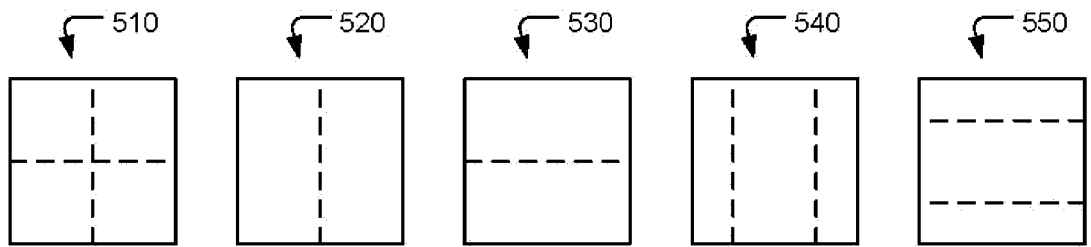
FIG. 5 illustrates examples of supported splits in VVC, including quad-split, vertical binary split, horizontal binary-split, vertical center-side ternary-split and horizontal center-side ternary-split.

The new standard under development, VVC (Versatile Video Codec), is supporting more partition shapes compared to HEVC. A so-called multi-type tree (MTT) partitioning is proposed, where in addition to quad-tree (QT) structure supported in HEVC, binary and ternary splits are added. All supported splits in VVC are shown in FIG. 5, including quad-split 510, vertical binary split 520, horizontal binary-split 530, vertical center-side ternary-split 540 and horizontal center-side ternary-split 550.

In MTT, the tree structure is coded separately for luma and chroma in I slices, and applied simultaneously to both luma and chroma (except for certain minimum sizes constraint for chroma) in P and B slices. This means that in I slice the luma CTB has its MTT-structured block partitioning, and the two chroma CTBs may have another MTT-structured block partitioning. Also, in order to increase coding gain for higher resolution videos, ternary (TT) and binary (BT) splits can be applied to 128×128 luma/64×64 chroma coding tree blocks (CTBs) recursively. In addition, the maximum supported size of the TU is increased to 64×64 luma/32×32 chroma.

Adaptive Multiple Transform (AMT) scheme is used for residual coding for both inter and intra coded blocks in VTM (VVC test model). Multiple selected transforms from the DCT/DST families other than the current transforms in HEVC are applied to the residual blocks. Lately, transform matrices of DST-7, DCT-8 and DST-1 have been introduced. Table 1 shows the basis functions of the selected DST/DCT.

TABLE 1

Transform basis functions of DCT/DSTs for N-point input

| Transform Type | Basis function $T_i(j)$, i, j, = o, . . . , N − 1 |
|---|---|
| DCT-8 | $T_i(j) = \sqrt{\dfrac{4}{2N+1}} \cdot \cos\left(\dfrac{\pi \cdot (2i+1) \cdot (2j+1)}{4N+2}\right)$ |
| DST-1 | $T_i(j) = \sqrt{\dfrac{2}{N+1}} \cdot \sin\left(\dfrac{\pi \cdot (i+1) \cdot (j+1)}{N+1}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |

The AMT is applied to the CUs with both width and height smaller than or equal to 64, and whether AMT applies or not is controlled by a CU level flag. When the CU level flag is equal to 0, DCT-2 is applied in the CU to encode the residue. For a luma coding block within the AMT enabled CU, two additional flags are signaled to identify the horizontal and vertical transform to be used. As in HEVC, the residual of a block can be coded with transform skip mode in the VTM. To avoid the redundancy of syntax coding, the transform skip flag is not signaled when the CU level AMT flag is not equal to zero.

For Intra residue coding, due to the different residual statistics of different Intra prediction modes, a mode-dependent transform candidate selection process is used. One embodiment of the three defined transform subsets is shown in Table 2. The transform subset may be selected based on the Intra prediction mode. One embodiment of the selection process based on the Intra mode is shown in Table 3.

TABLE 2

Three pre-defined transform candidate sets

| Transform Set | Transform Candidates |
|---|---|
| 0 | DST-7, DCT-8 |
| 1 | DST-7, DST-1 |
| 2 | DST-7, DCT-8 |

With the subset concept, transform subsets are first identified based on Table 2 using the Intra prediction mode of a CU with the CU-level AMT flag is equal to 1. After that, for each of the horizontal and vertical transforms, one of the two transform candidates in the identified transform subset, can be selected and explicitly signaled with flags.

In case of Inter prediction residual, only one transform set, which consists of DST-7 and DCT-8, can be used for all Inter modes and for both horizontal and vertical transforms.

Furthermore, DCT-8 is known to have the following relationship with DST-7:

$$C_N^{VIII} = J_N S_N^{VII} D_N \quad (1)$$

$$[J_N]_{ij,i,j=0,\ldots,N-1} = \begin{cases} 1, & j = N-1-i \\ 0, & \text{otherwise} \end{cases}$$

$$[D_N]_{ij,i,j=0,\ldots,N-1} = \text{diag}((-1)^k), k = 0, \ldots, N-1 = \begin{cases} (-1)^i, & i = j \\ 0, & i \neq j \end{cases}$$

The $C_N^{VIII}$ and $S_N^{VII}$ in Equation (1) are inverse transform matrices for DCT-8 and DST-7, and i and j are row and column indices, respectively. In Equation (1), $J_N$ is the matrix represented by is along its anti-diagonal line, and the matrix $D_N$ alternates between 1 and −1 on its diagonal line. Therefore, DCT8 can be derived from DST7 with sign changes and reordering just before and after the DST7 computation. Hence, DST7 is reused in this implementation for DCT8. The sign changes and shuffling do not add any additional overhead to DST7, so that the computational complexity of DCT8 is identical to that of DST7. This avoids the usage of any additional memory in DCT8 and DST-1.

Since more block sizes and AMT are supported in VVC, a more efficient quantization matrix representation method is required in VTM.

According to the present invention, the default quantization matrices of size M×N are first defined and stored with a specified coefficient at each position for M×N transform unit, where M and N can be any even number between 2 and 64. In one embodiment, there can be three quantization/scaling matrices: one of size M=N=4 (for residual blocks of size 4×4, both Intra and Inter predictions) and two of size M=N=8 (one for Intra prediction and another one for Inter prediction). As an example, the corresponding matrices (310, 320 and 330) in FIG. 3 can be used as the default quantization matrices. In another embodiment, only default matrices for Intra prediction can be defined (e,g, for sizes 4×4 and 8×8), while quantization matrices for Inter prediction can be obtained from the corresponding matrices for Intra prediction.

In another embodiment, the default M×N quantization matrices are defined and stored, which are used to derive the default $2^p \times 2^k$ quantization matrices for $2^p \times 2^k$ transform units, where p and k can take any value between 1 and 6. For example, k=p=4, k=p=5 or k=p=6, which would give sizes 16×16, 32×32, and 64×64.

After the default quantization matrices are defined and stored, a method (e.g., coefficient mapping and interpolation (named as coefficient mapping and interpolation step) including simple zero order interpolation method that uses repetition and linear interpolation based up-sampling) to generate the default quantization matrix for $2^p \times 2^k$ (e.g. 4×4, 4×8, 8×4, 8×8, 4×16, 16×4, 4×32, 32×4, 8×16, 16×8, 16×16, 8×32, 32×8, 16×32, 32×16, 32×32, 16×64, 64×16, 32×64, 64×32, 64×64) transformed block from the default M×N quantization matrices.

Figure 6:
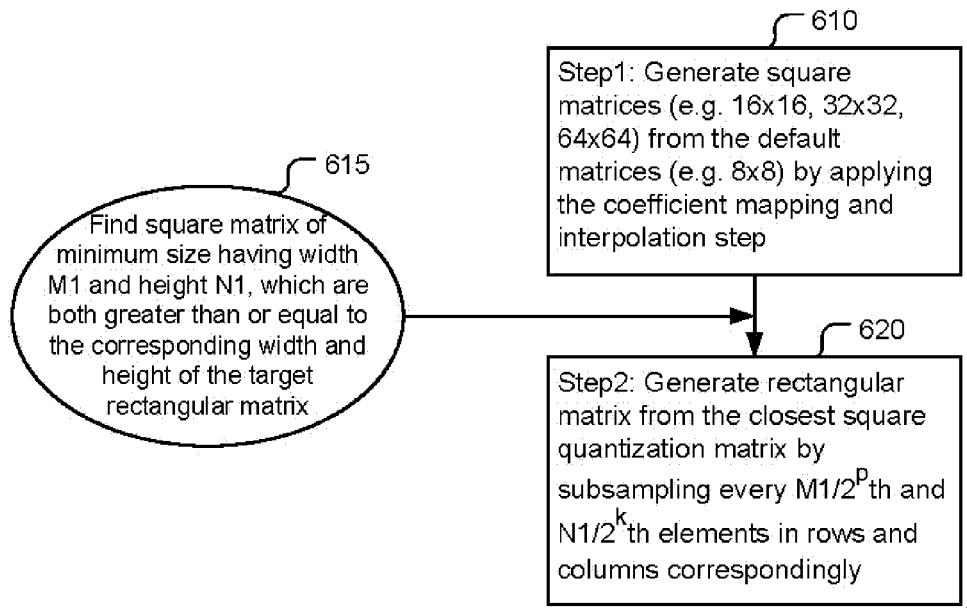
FIG. 6 illustrates one example of deriving a rectangular scaling matrix from a shared based 8×8 quantization matrix.
Figure 7:
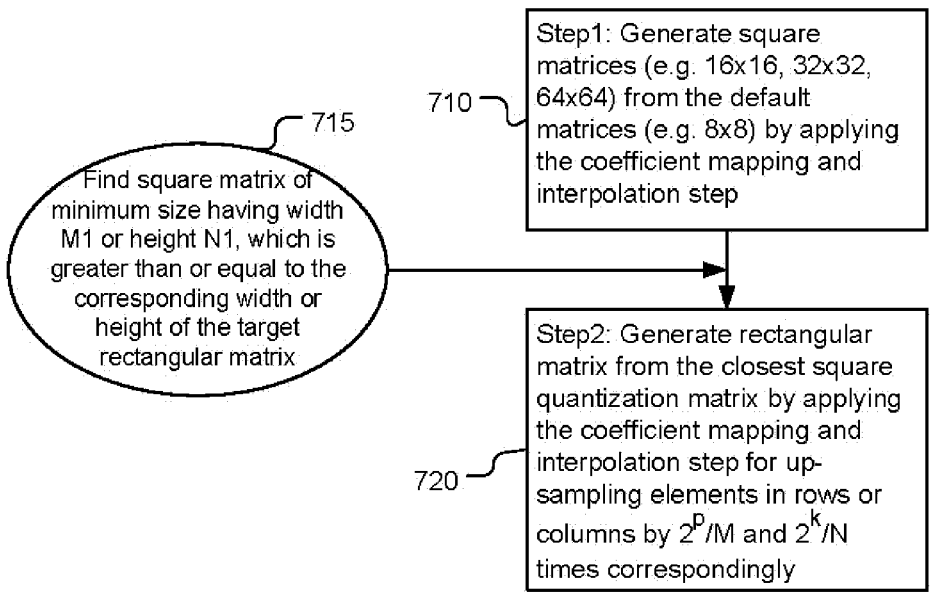
FIG. 7 illustrates another example of deriving a rectangular scaling matrix from a shared based 8×8 quantization matrix.
Figure 8:
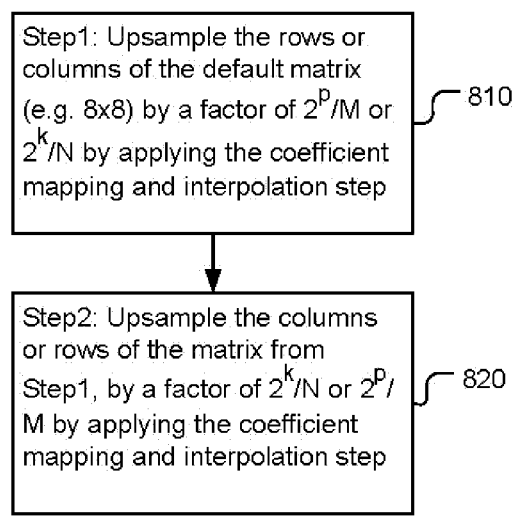
FIG. 8 illustrates yet another example of deriving a rectangular scaling matrix from a shared based 8×8 quantization matrix.

The following flowcharts show three possible embodiments for defining matrices with a block size corresponding to $2^p \times 2^k$. In one embodiment, in FIG. 6 for example, for step 1 (610), at first, several square matrices (e.g. 16×16, 32×32, 64×64) are generated from the default matrices (e.g. 8×8) by applying the coefficient mapping and interpolation step. In step 2 (620), rectangular matrix is generated from the closest square quantization matrix by subsampling every M1/$2^p$th and N1/$2^k$th elements in rows and columns correspondingly. The square matrix of minimum size with width M1 and height N1 is determined step 615, which are greater than or equal to both the corresponding width and height of the target rectangular matrix. For example, M1 and N1 can be equal to M. Thus, the closest square quantization matrix is M×M. In other examples, M1 may not be equal to N1, if the minimum size is M among M1 and N1, then closest square matrix is M×M. In FIG. 7, for step 1 (710), square matrices (e.g. 16×16, 32×32, 64×64) are generated from the default matrices (e.g. 8×8) by applying the coefficient mapping and interpolation step. In step 2 (720), rectangular matrix is generated from the closest square quantization matrix by applying the coefficient mapping and interpolation step for up-sampling elements in rows or columns by $2^p$/M and $2^k$/N times correspondingly. The square matrix of minimum size with width M1 or height N1 is determined step 715, which are greater than or equal to the corresponding width or height of the target rectangular matrix. In FIG. 8, for step 1 (810), the rows or columns of the default matrix (e.g. 8×8) are up-sampled by a factor of $2^p$/M or $2^k$/N by applying the coefficient mapping and interpolation step. In step 2 (820), the columns or rows of the matrix from step 1 810, are up-sampled by a factor of $2^k$/N or $2^p$/M by applying the coefficient mapping and interpolation step.

In yet another embodiment, it is possible to up-sample the M×N matrices in a small interval for low frequency coefficients and up-sample the M×N matrices in a big interval for high frequency coefficients.

Figure 9:
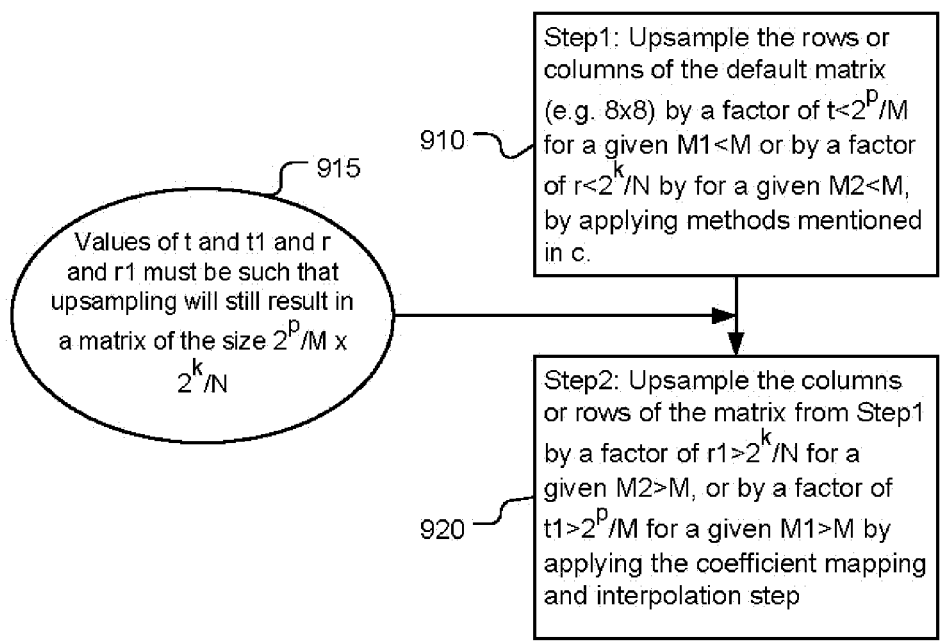
FIG. 9 illustrates yet another example of deriving a rectangular scaling matrix from a shared based 8×8 quantization matrix.

An example is shown in FIG. 9. In FIG. 9, for step 1 (910), the rows or columns of the base scaling matrix (e.g. 8×8) are up-sampled by a factor of $t < 2^p$/M for a given M1<M or by a factor of $r < 2^k$/N for a given M2<M, by applying the coefficient mapping and interpolation step. In step 2 (920), the columns or rows of the matrix from step 1 910 are up-sampled by a factor of $r1 > 2^k$/N for a given M2>M, or by a factor of $t1 > 2^p$/M for a given M1>M by applying the coefficient mapping and interpolation step. The values of t and t1 and r and r1 are determined in step 915, where these values must be such that up-sampling will still result in a matrix of the size $2^p/M \times 2^k/N$.

As an example, the 8×8 quantization matrix (base scaling matrix) for IntraLuma, IntraCb, IntraCr can be used for obtaining the 16×16 quantization matrix InterLuma, InterCb, InterCr for 16×16 transform units. For obtaining the first quantization matrix, up-sampling by a factor of 2 is applied in the horizontal and vertical directions. This will result in following 16×16 quantization matrix:

$$\begin{bmatrix}
16 & 16 & 16 & 16 & 16 & 16 & 16 & 16 & 17 & 17 & 18 & 18 & 20 & 21 & 24 & 24 \\
16 & 16 & 16 & 16 & 16 & 16 & 16 & 17 & 17 & 18 & 18 & 20 & 20 & 24 & 24 \\
16 & 16 & 16 & 16 & 16 & 16 & 17 & 17 & 18 & 18 & 20 & 20 & 24 & 24 & 25 & 25 \\
16 & 16 & 16 & 16 & 16 & 17 & 17 & 18 & 18 & 20 & 20 & 24 & 24 & 25 & 25 \\
16 & 16 & 16 & 16 & 17 & 17 & 18 & 18 & 20 & 20 & 24 & 24 & 25 & 25 & 28 & 28 \\
16 & 16 & 16 & 17 & 17 & 18 & 18 & 20 & 20 & 24 & 24 & 25 & 25 & 28 & 28 \\
16 & 16 & 17 & 17 & 18 & 18 & 20 & 20 & 24 & 24 & 25 & 25 & 28 & 28 & 33 & 33 \\
16 & 16 & 17 & 17 & 18 & 18 & 20 & 20 & 24 & 24 & 25 & 25 & 28 & 28 & 33 & 33 \\
17 & 17 & 18 & 18 & 20 & 20 & 24 & 24 & 25 & 25 & 28 & 28 & 33 & 33 & 41 & 41 \\
17 & 17 & 18 & 18 & 20 & 20 & 24 & 24 & 25 & 25 & 28 & 28 & 33 & 33 & 41 & 41 \\
18 & 18 & 20 & 20 & 24 & 24 & 25 & 25 & 28 & 28 & 33 & 33 & 41 & 41 & 54 & 54 \\
18 & 18 & 20 & 20 & 24 & 24 & 25 & 25 & 28 & 28 & 33 & 33 & 41 & 41 & 54 & 54 \\
20 & 20 & 24 & 24 & 25 & 25 & 28 & 28 & 33 & 33 & 41 & 41 & 54 & 54 & 71 & 71 \\
20 & 20 & 24 & 24 & 25 & 25 & 28 & 28 & 33 & 33 & 41 & 41 & 54 & 54 & 71 & 71 \\
24 & 24 & 25 & 25 & 28 & 28 & 33 & 33 & 41 & 41 & 54 & 54 & 71 & 71 & 91 & 91 \\
24 & 24 & 25 & 25 & 28 & 28 & 33 & 33 & 41 & 41 & 54 & 54 & 71 & 71 & 91 & 91
\end{bmatrix}$$

As another example, the 8×8 quantization matrix (base scaling matrix) for IntraLuma, IntraCb, IntraCr can be used for obtaining 8×16 quantization matrix for 8×16 transform blocks. For obtaining the second quantization matrix, up-sampling would be applied only to columns. This will result in following 8×16 quantization matrix:

$$\begin{bmatrix} 16 & 16 & 16 & 16 & 16 & 16 & 16 & 16 & 17 & 17 & 18 & 18 & 20 & 21 & 24 & 24 \\ 16 & 16 & 16 & 16 & 16 & 16 & 17 & 17 & 18 & 18 & 20 & 20 & 24 & 24 & 25 & 25 \\ 16 & 16 & 16 & 16 & 17 & 17 & 18 & 18 & 20 & 20 & 24 & 24 & 25 & 25 & 28 & 28 \\ 16 & 16 & 17 & 17 & 18 & 18 & 20 & 20 & 24 & 24 & 25 & 25 & 28 & 28 & 33 & 33 \\ 17 & 17 & 18 & 18 & 20 & 20 & 24 & 24 & 25 & 25 & 28 & 28 & 33 & 33 & 41 & 41 \\ 18 & 18 & 20 & 20 & 24 & 24 & 25 & 25 & 28 & 28 & 33 & 33 & 41 & 41 & 54 & 54 \\ 20 & 20 & 24 & 24 & 25 & 25 & 28 & 28 & 33 & 33 & 41 & 41 & 54 & 54 & 71 & 71 \\ 24 & 24 & 25 & 25 & 28 & 28 & 33 & 33 & 41 & 41 & 54 & 54 & 71 & 71 & 91 & 91 \end{bmatrix}$$

In one embodiment, a method according to the present invention may use linear combination of corresponding coefficients, matrix multiplication, linear/nonlinear regression, etc. to generate the quantization matrix for different transformed blocks obtained by applying AMT from the default M×N quantization matrices.

In another embodiment, a method according to the present invention may use linear combination of corresponding coefficients, matrix multiplication, linear/nonlinear regression, etc. to generate the quantization matrix for Intra transform blocks from the default M×N quantization matrices.

In yet another embodiment, a method according to the present invention may use a method to signal the default quantization matrix for different transformed blocks obtained by applying AMT.

Customized Quantization Matrices Representation

In one embodiment, the user defined M×N quantization matrices with a specified coefficient in each position are defined and sent for M×N transform unit with lossless entropy coding. The M and N can be any even number between 2 and 64.

In another embodiment, the user defined smaller size quantization matrices of size M×N (where M and N be any even number between 2 and 64) are defined and sent, which are used to derive the $2^p \times 2^k$ quantization matrices for $2^p \times 2^k$ transform units, where p and k can take any value between 1 and 6.

In another embodiment, a method is disclosed to use coefficient mapping and interpolation including simple zero order interpolation by pixel repetition and linear interpolation based up-sampling to generate the scaling matrix for $2^p \times 2^k$ (p !=k) transformed blocks (e.g. 4×8, 8×4, 4×16, 16×4, 4×32, 32×4, 8×16, 16×8, 8×32, 32×8, 16×32, 32×16, 16×64, 64×16, 32×64, 64×32) from the M×N quantization matrices, without sending any bits.

In this embodiment, for example, at decoder side, a plurality sizes of base scaling matrices are signaled and received. One of the base scaling matrices is selected (at least not larger than the transform blocks). To generate a target scaling matrix for a M×N transform block, first, the above-mentioned up-sampling methods may be applied to the base scaling matrix to generate an M×M matrix. Then, the target scaling matrix is derived from the M×M scaling matrix by sub-sampling the M×M scaling matrix to an M×N or N×M scaling matrix as the target scaling matrix. For example, if a received transform block size is 32×8, then an 8×8 base scaling matrix is selected. Then, by using pixel repetition or linear interpolation, a 32×32 scaling matrix is generated from the 8×8 base scaling matrix. Sub-sampling is then applied to the 32×32 scaling matrix so that a 32×8 scaling matrix is generated. Methods of sub-sampling may vary, for instance, one sub-sampling method may include taking every $M/2^p$th and $M/2^k$th coefficient in columns and rows respectively in the M×M scaling matrix, wherein M equals $2^p$ and N equals $2^k$. This embodiment corresponds to setting M1 and N1 to M in FIG. 6.

In yet another embodiment, a method is disclosed to use linear combination of corresponding coefficients, matrix multiplication, linear/nonlinear regression, etc. to generate the user defined quantization matrix for different transformed blocks obtained by applying AMT from the default M×N quantization matrices, without sending any additional bits.

In yet another embodiment, a method is disclosed to use linear combination of corresponding coefficients, matrix multiplication, linear/nonlinear regression, etc. to generate the user defined quantization matrix for Inter transformed blocks obtained from the default M×N quantization matrices for Intra transform blocks, without sending any additional bits.

Methods for Generating Smaller Size M×N Quantization Matrices

Methods to generate smaller size M×N quantization matrices for M×N transform units are disclosed, where M and N can be any even number between 2 and 64) from bigger $2^p \times 2^k$ matrices, where p and k can take any value between 1 and 6.

In one embodiment, the method always keeps the DC coefficient and subsample the M×N matrices in a fixed interval.

In another embodiment, the method always keeps the DC coefficient and subsample the M×N matrices in a small interval in low frequency coefficients and subsample the M×N matrices in a big interval in high frequency coefficients.

In yet another embodiment, the method always keeps the DC coefficient and the low frequency part of the M×N matrices, which has the same size of the target smaller size matrices.

Methods to Derive Big Size $2^p \times 2^k$ Quantization Matrices

Methods to derive big size $2^p \times 2^k$ quantization matrices are disclosed, where p and k can take any value between 1 and 6. The $2^p \times 2^k$ quantization matrices correspond to smaller size M×N quantization matrices generated by different sub-sampling methods described as above for the smaller size M×N quantization matrices, where M and N can be any even number between 2 and 64.

In one embodiment, the up-sampling method uses fixed interval interpolation and/or repetition. In cases when p!=k, (i.e., non-square transform), the number of interpolated coefficients in horizontal and vertical direction is equal to $2^p/M$ and $2^k/N$ respectively, where ($2^p$ and M) and ($2^k$ and N) correspond the number of rows and the number of columns in the target and signaled matrices respectively.

In another embodiment, the up-sampling method by uses smaller interval interpolation and/or repetition for low frequency coefficients and uses bigger interval interpolation and/or repetition for high frequency coefficients.

In yet another embodiment, the smaller size M×N matrices (M and N be any even number between 2 and 64) are used as the low frequency part of the big size $2^p \times 2^k$ quantization matrices (p and k be any value between 1 and 6) and the high frequency coefficients are generated based on a fixed pattern. In one embodiment, one can start from the end of low frequency part and increase the coefficient value with a fixed number with the increase of the frequency.

Methods to Derive M×N Quantization Matrices Corresponding to M×N Transform Units Methods to derive M×N quantization matrices corresponding to M×N transform units are disclosed (M and N be any numbers between 2 and 64) for the cases that matrix for Inter prediction is defined from the corresponding matrix for Intra prediction In one embodiment, different quantization matrices for Inter prediction transform blocks can be obtained depending on the size of the transform unit. In other words, all matrices for Inter prediction are defined from the corresponding quantization matrices for Intra prediction by applying methods such as linear combination of corresponding coefficients, matrix multiplication, linear/nonlinear regression, etc to the corresponding elements of the matrices for Intra blocks.

In another embodiment, only certain quantization matrices for Inter prediction transform blocks are obtained from the corresponding quantization matrices for Intra prediction by applying methods such as linear combination of corresponding coefficients, matrix multiplication, linear/nonlinear regression, etc to the corresponding elements of the matrices for Intra blocks. All rectangular matrices for Inter transform blocks may be obtained from the corresponding square quantization matrices for Inter transform blocks, by applying the default quantization matrices representation disclosed above.

Methods to Derive M×N Quantization Matrices Corresponding to M×N Transform Units for AMT Methods to derive M×N quantization matrices corresponding to M×N transform units (M and N be any even numbers between 2 and 64) for the case when AMT is applied to residual signal (e.g. depending on different prediction modes). In this case, different quantization/scaling matrices may be applied depending on the transform type, such that it will be aligned to the energy compaction after the transform.

In one embodiment, different scaling matrices can be defined depending on the prediction mode (i.e., Inter or Intra prediction) independent of the transform types in AMT applied to the residual block.

In another embodiment, separate matrices can be obtained for block sizes smaller than K, where K can take any value from 4 to 32. For all remaining transform block sizes, same quantization matrices are used independent of the transform applied to the residual block.

In yet another embodiment, different scaling matrices are obtained for luma and chroma component, independent of the transform types in AMT applied to the residual block.

In another embodiment, transforms allowed in AMT are DST-1, DST-7, and DCT-8 and different scaling/quantization matrices can be defined for each transform, including DCT-2. The scaling/quantization matrices can be applied after horizontal and vertical transformation step.

In another embodiment, the transforms allowed include DST-1, DST-7, and DCT-8 and different scaling matrices may be computed for all combinations of DCT-2, DST-1, DST-7, and DCT-8 transforms based on the relation between these transforms.

In yet another embodiment, only a few scaling matrices are defined for the basic set of transforms (e.g. DCT-2, DST-1, DST-7, and DCT-8) and scaling matrices for the result of combination of the basis transforms may be defined by linear combination, matrix multiplication, permutation, sign changes, flipping, or any combination of these transformations of the basis scaling matrices.

In another embodiment, scaling matrices may be defined and signaled for a subset of basic transforms, (e.g. DCT-2, or DCT-2 and DST-7) and scaling matrices for the rest of the transforms (e.g. for DST-7, DST-1, and DCT-8, or for DST-1 and DCT-8) may be defined by linear combination, matrix multiplication, permutation, sign changes, flipping, or any combination of these transformations of the basis scaling matrices. In one example, the derivation process is dependent on the relationship between the defined transform type and the target transform type. In another example, the derivation process is dependent on the relationship between the defined transform coefficients and the target transform coefficients.

Any combination of the abovementioned methods of scaling matrices derivation can be used.

Option for Default Quantization Matrices Choices

A scheme is disclosed to provide the option for a user to decide between either default quantization matrices, or user defined quantization matrices, or use residual coding without any quantization applied (e.g., PCM transform/quantization bypass mode)

Zero-Out Process Applied with Scaling Matrices Generation

In one embodiment, an M×N scaling matrix set is used to quantize TUs with size larger than M×N if zero out is applied. In other words, all scaling matrix entries with row numbers larger than P are set to zero and all scaling matrix entries with column numbers larger than Q are set to zero. P and Q can be both smaller than CU width and CU height, only P smaller than CU width, or only Q smaller than CU height. For example, a 32×32 scaling matrix set is used to quantize 64×64 TUs if zero-out is applied to CU row larger than 32 and column larger than 32. In another example, a 32×4 scaling matrix set is used to quantize 64×4 TUs if zero-out is applied to CU column larger than 32. In another embodiment, an M×N scaling matrices set is used to quantize M×N TUs. The values in scaling matrices outside row P and column Q are assigned to zero. P and Q can be both smaller than M and N, only P smaller than M, or only Q smaller than N. For example, a 64×64 TU is quantized with a 64×64 scaling matrix. However, the values in range outside 32×32 are set to zero. In other words, the range outside 32×32 will be zeroed out in the quantization process. In another example, a 64×4 TU is quantized with a 64×4 scaling matrix. However, the values in range outside of the top-left 32×4 are zeroed out in the scaling matrix. In other words, the range outside 32×4 will be zeroed out in the quantization process.

In another embodiment, a method is disclosed to use coefficient up-sampling, coefficient mapping and interpolation (e.g., simple zero order interpolation by pixel repetition and linear interpolation based up-sampling) to generate the quantization matrix for $2^p \times 2^k$ with p!=k (e.g. 4×8, 8×4, 4×16, 16×4, 4×32, 32×4, 8×16, 16×8, 8×32, 32×8, 16×32, 32×16, 16×64, 64×16, 32×64, 64×32) and $2^p \times 2^k$ with p=k (e.g. 16×16, 32×32, 64×64) transformed block from the smaller M×N (e.g. 4×4, 8×8) quantization matrices, without sending any bits. A smaller number of smaller M×N quantization matrices need to be decoded when zero out is applied. For example, a 64×64 TU needs 64×64 scaling matrices for quantization. The 64×64 scaling matrices can be generated from 8×8 quantization matrices by up-sampling. When zero out is applied to 64×64 TUs, only 4×4 quantization matrices are needed to be signaled to generate the 64×64 scaling matrices because the range outside 32×32 in the 64×64 scaling matrices will be always zero. Therefore, for the 64×64 TU scaling matrix, it only needs to signal a 4×4 matrix. In one example, only the 64×64 TU scaling matrix is derived from the 4×4 matrix. For 64×N or M×64 TU scaling matrix, it is up-sampled from 32×N or M×32 TU scaling matrix.

In yet another embodiment, after decoding the smaller M×N quantization matrices, the M×N quantization matrices are up-sampled to P×Q when zero out is applied on row P and column Q. For example, a 64×64 TU needs 64×64 scaling matrices for quantization. The 64×64 scaling matrices are generated from 8×8 quantization matrices by up-sampling. When zero out is applied on row 32 and column 32 of the 64×64 TUs, the 8×8 quantization matrices will be up-sampled to 32×32 and the range outside row 32 or column 32 will be filled with zero. Therefore, for scaling matrixes for both 32×32 TU and 64×64 TU, an 8×8 matrix is signaled. For the 64×64 TU scaling matrix, an 8×8 matrix is used and up-sampled to a 64×64 matrix. The scaling matrix values outside of the top-left 32×32 are all zeroed out. In one example, only the 64×64 scaling matrix is derived from the 8×8 matrix. For 64×N or M×64 scaling matrix, the 64×64 scaling matrix is up-sampled from a 32×N or M×32 scaling matrix.

Default Quantization Matrices for Multiple Transform Set (MTS)

When multiple transform set (MTS) is applied, the coefficients zero out for the transformed coefficients outside of the top-left 16×16 region is also applied. If the scaling matrix for default transform (e.g. DCT-2 transform) and MTS are shared, the same scaling matrix signaling and up-sampling process can be applied. However, if the scaling matrix for default and MTS can be different, the different scaling matrix signaling or different up-sampling process are applied. In one example, for a 32×32 TU, if the MTS is applied, the coefficients outside the top-left 16×16 region are zeroed out. Therefore, only a 16×16 scaling matrix is required for the 32×32 TU with MTS. In one embodiment, an M×N matrix (e.g. an 8×8 matrix) is signaled. The M×N can be the same size as the signaled matrix size for 32×32 default transform TU. This M×N matrix is up-sampled to be a 16×16 matrix for this 32×32 TU with MTS. In another embodiment, an M×N matrix (e.g. a 4×4 matrix) is signaled. The M×N can be smaller than the size of the signaled matrix size for 32×32 default transform TU. This M×N matrix is up-sampled to a 16×16 matrix for this 32×32 TU with MTS.

Variants of Scaling Matrix Generation

In another embodiment, even when the coefficient zero-out is applied, a base scaling matrix with the size the same as the TU is still generated. For example, for a 64×64 TU, even though the coefficient zero-out is applied, only the top-left 32×32 coefficients are meaningful, a 64×64 base scaling matrix is still generated. This 64×64 base scaling matrix can be used to generate the scaling matrix of M×64 or 64×N. In one example, in the generated scaling matrix, the entry values for the zero-out coefficient band can be zero.

In another example, for the M×N or N×M scaling matrix, where M is larger than N, it is derived from an M×M matrix and down-sampled to the M×N or N×M matrix. In another example, for the M×N or N×M scaling matrix, where M is larger than N, it is derived from an N×N matrix and up-sampled to the M×N or N×M matrix.

In one embodiment, the scaling matrix of the 64×64, 64×N, M×64 TU are up-sampled and down-sampled from the scaling matrix of 32×32 TU. No syntax is required for the 64×64 scaling matrix. For example, the user defined scaling matrix only contains 4×4, 8×8, 16×16, and 32×32.

In one embodiment, Intra block copy mode uses the scaling matrices used in Inter mode.

In another embodiment, Intra block copy mode uses the scaling matrices used in Intra mode.

In another embodiment, Intra block copy mode has another set of scaling matrices, which is different from those used in Inter mode and Intra mode.

In another embodiment, some of scaling matrices used in Intra block copy mode are the same as those used in Inter mode, and others are the same as those used in Intra mode. The selection can be implicit selection, (e.g., dependent on the size, quantization parameter, tile group type), or explicit selection (e.g., signaling the selection at sequence level, picture level, tile group level, tile level, or block level).

Any of the foregoing proposed methods can be implemented in various hardware, software realizations of encoders and/or decoders, or a combination of thereof. For example, an embodiment of the present invention can be one or more circuits integrated into a video compression chip or program code integrated into video compression software to perform the processing described herein. For example, any of the proposed methods can be implemented as a circuit coupled to a quantization module and an inverse quantization module of the encoder, and can be implemented as a circuit coupled to an inverse quantization module of the decoder. In one embodiment, any of the proposed methods can be implemented in a quantization module and an inverse quantization module of an encoder, and can be implemented in an inverse quantization module of a decoder.

Syntaxes Design

In this invention, a set of syntaxes is disclosed for signaling of the present invention, where the syntaxes can be signaled in SPS (sequence parameter set RBSP syntax), PPS (picture parameter set RB SP syntax), slice, tile, CTU, and CU header to signal the quantization matrix to the decoder.

In one embodiment, a sequence level, "seq_quant_matrix_present_flag" is used in SPS to signal whether the whole sequence will use quantization matrix or not. In one embodiment, if "seq_quant_matrix_present_flag" is true, another syntax, "seq_quant_matrix_present_idx" is checked for each transform size and each channel (Y,U,V) to determine whether the specified transform size and each channel will use quantization matrix or not. In one embodiment, if "seq_quant_matrix_present_idx" is true, another syntax, "use_default_seq_quant_matrix" is checked to determine whether if the default quantization matrix will be used. In one embodiment, if "use_default_seq_quant_matrix" is signaled, the default quantization matrix will be used. In this case, the default quantization matrices are read from the memory, and the remaining square, rectangle quantization matrices, bigger quantization matrices and quantization matrices for all cases of AMT will be implicitly generated from the default quantization matrices. In one embodiment, if "use_default_seq_quant_matrix" is false, the sequence level quantization matrices are explicitly generated by coding methods such as the prediction based entropy coding.

In another embodiment, a picture-level syntax, "pic_quant_matrix_present_flag" is used in PPS to signal whether the current picture will use quantization matrix or not. The following syntax can then be added either in PPS, slice, tile, CTU, or CU level. In one embodiment, if "pic_quant_matrix_present_flag" is true, another syntax, "pic_quant_matrix_present_idx" is checked for each prediction mode, transform, transform size and each channel (Y,U,V) to determine whether the specified prediction mode, transform, transform size and each channel will use quantization matrix or not. In one embodiment, if "pic_quant_matrix_present_idx" is true, another syntax, "use_seq_quant_matrix_flag" is checked to determine whether the sequence level quantization matrix will be used. In one embodiment, if "pic_quant_matrix_present_idx" is not true, for certain prediction modes and small transform sizes, the quantization matrices are explicitly generated by coding methods such as the prediction based entropy coding. In one embodiment, for the rectangle and bigger transform sizes, syntax, "use_implicit_quant_matrix" is checked. If it is true, the quantization matrix is implicitly generated by methods such as the proposed methods in the contents. Otherwise, the quantization matrix is explicitly generated by coding methods such as the prediction based entropy coding.

Video encoders have to follow the foregoing syntax design so as to generate the legal bitstream, and video decoders are able to decode the bitstream correctly only if the parsing process complies with the foregoing syntax design. When the syntax is skipped in the bitstream, encoders and decoders should set the syntax value as an inferred value to guarantee the encoding and decoding results are matched.

Figure 10:
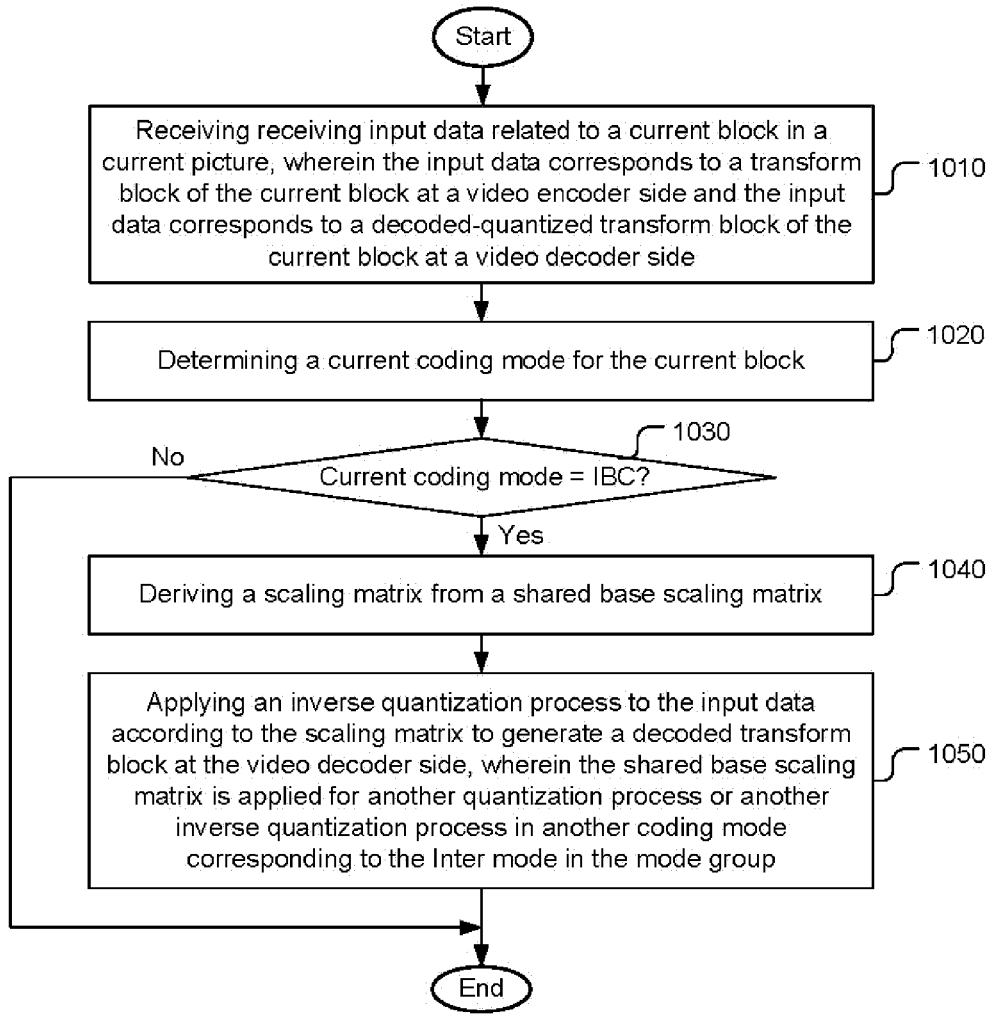
FIG. 10 illustrates a flowchart of an exemplary coding system using a shared based scaling matrix for the Intra Block Copy (IBC) mode and the Inter mode according to an embodiment of the present invention.

FIG. 10 illustrates a flowchart of an exemplary coding system using a shared default scaling matrix for the Intra Block Copy (IBC) mode and the Inter mode according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data related to a current block in a current picture are received in step 1010, wherein the input data correspond to a transform block of the current block at a video encoder side and the input data correspond to a decoded-quantized transform block of the current block at a video decoder side. A current coding mode is determined for the current block in step 1020. Whether the current coding mode is the IBC mode is checked in step 1030. When the current coding mode is the IBC mode, steps 1040 and 1050 are performed. If the current coding mode is not the IBC mode, steps 1040 and 1050 are skipped. In step 1040, a scaling matrix is derived from a shared base scaling matrix. In step 1050, an inverse quantization process is applied to the input data according to the scaling matrix to generate a decoded transform block at the video decoder side, wherein the shared base scaling matrix is applied for another quantization process in another coding mode corresponding to the Inter mode in the mode group.

Figure 11:
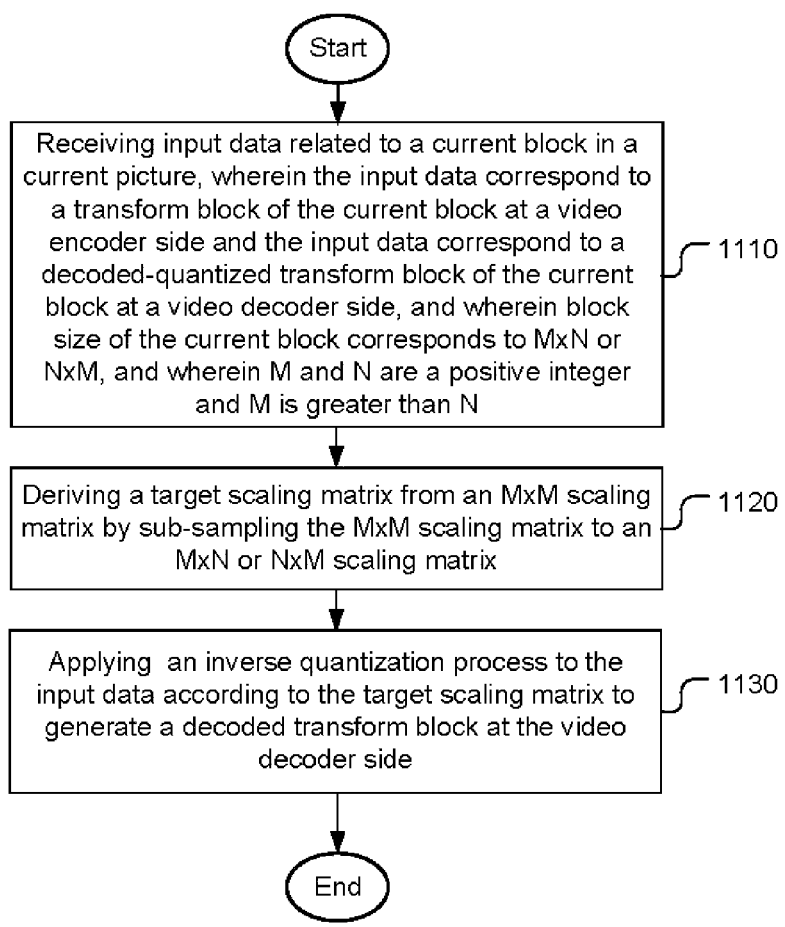
FIG. 11 illustrates a flowchart of an exemplary coding system using scaling matrix derivation method according to an embodiment of the present invention.

FIG. 11 illustrates a flowchart of an exemplary coding system using scaling matrix derivation method according to an embodiment of the present invention. According to this method, input data related to a current block in a current picture are received in step 1110, wherein the input data correspond to a transform block of the current block at a video encoder side and the input data correspond to a decoded-quantized transform block of the current block at a video decoder side and wherein M and N are a positive integer and M is greater than N. A target scaling matrix is derived from an M×M scaling matrix by sub-sampling the M×M scaling matrix to an M×N or N×M scaling matrix in step 1120. In step 1130, an inverse quantization process is applied to the input data according to the target scaling matrix to generate a decoded transform block at the video decoder side The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding using a coding mode belonging to a mode group comprising an Intra Block Copy (IBC) mode and an Inter mode, the method comprising:
   receiving input data related to a current block in a current picture, wherein the input data correspond to a transform block of the current block at a video encoder side and the input data correspond to a decoded-quantized transform block of the current block at a video decoder side;
   determining a current coding mode for the current block;
   when the current coding mode corresponds to the IBC mode:

deriving a scaling matrix from a shared base scaling matrix, the shared base scaling matrix comprising a default square matrix, the scaling matrix comprising a rectangular matrix based on up-sampling, down-sampling, or up-sampling and down-sampling according to the shared base scaling matrix; and applying an inverse quantization process to the input data according to the scaling matrix to generate a decoded transform block at the video decoder side, wherein the inverse quantization process uses the scaling matrix to generate the decoded transform block;

wherein the shared base scaling matrix is applied to another quantization process or another inverse quantization process in another coding mode corresponding to the Inter mode in the mode group.

2. The method of claim 1, further comprising applying a quantization process to the input data according to the scaling matrix to generate a coded-quantized transform block at the video encoder side.

3. An apparatus of video coding using a coding mode belonging to a mode group comprising an Intra Block Copy (IBC) mode and an Inter mode and the apparatus comprising one or more electronic circuits or processors arranged to:

receive input data related to a current block in a current picture, wherein the input data correspond to a transform block of the current block at a video encoder side and the input data correspond to a decoded-quantized transform block of the current block at a video decoder side;

determine a current coding mode for the current block;

when the current coding mode corresponds to the IBC mode:

derive a scaling matrix from a shared base scaling matrix, the shared base scaling matrix comprising a default square matrix, the scaling matrix comprising a rectangular matrix based on up-sampling, down-sampling, or up-sampling and down-sampling according to the shared base scaling matrix; and apply a quantization process to the input data according to the scaling matrix to generate a coded-quantized transform block at the video encoder side or apply an inverse quantization process to the input data according to the scaling matrix to generate a decoded transform block at the video decoder side, wherein the quantization process uses the scaling matrix to generate the coded-quantized transform block, and the inverse quantization process uses the scaling matrix to generate the decoded transform block;

wherein the shared base scaling matrix is applied for to another quantization process or another inverse quantization process in another coding mode corresponding to the Inter mode in the mode group.

4. The apparatus of video coding of claim 3, wherein said one or more electronic circuits or processors are arranged to apply a quantization process to the input data according to the scaling matrix to generate a coded-quantized transform block at the video encoder side.

* * * * *